United States Patent [19]

Leduc

[11] Patent Number: 5,204,898
[45] Date of Patent: Apr. 20, 1993

[54] METHOD OF PROTECTION AGAINST THE UNAUTHORIZED UNSCRAMBLING OF SCRAMBLED TELEVISION BROADCASTS, AND IMPLEMENTATION METHOD

[75] Inventor: Michel Leduc, Boersch, France

[73] Assignee: Laboratoire Europeen de Recherches Electroniques Avancees Sociate en Nom Collectif, Courbevoie, France

[21] Appl. No.: 734,781

[22] Filed: Jul. 23, 1991

[30] Foreign Application Priority Data

Aug. 3, 1990 [FR] France ............................. 90 09969

[51] Int. Cl.5 ............................................. H04N 7/167
[52] U.S. Cl. ......................................... 380/14; 380/10; 380/12; 380/17
[58] Field of Search .................... 380/9, 10, 12, 14, 17

[56] References Cited

U.S. PATENT DOCUMENTS 4,827,510 5/1989 Walker et al. .

FOREIGN PATENT DOCUMENTS 0113148 7/1984 European Pat. Off. .
0325509 7/1989 European Pat. Off. .
2541841 8/1984 France .

Primary Examiner—David Cain
Attorney, Agent, or Firm—Oblon, Spivak, McClelland, Maier & Neustadt

[57] ABSTRACT

According to the disclosed method, decoys which are the reproduction of the corresponding interpolated sequence are inserted into the scrambled line, at the end of the first section and at the start of the second section.

7 Claims, 2 Drawing Sheets

METHOD OF PROTECTION AGAINST THE UNAUTHORIZED UNSCRAMBLING OF SCRAMBLED TELEVISION BROADCASTS, AND IMPLEMENTATION METHOD

BACKGROUND OF THE INVENTION

1. Field of the Invention

The present invention relates to a method of protection against the unauthorized unscrambling of scrambled television broadcasts, as well as to a device for the implementation of such a method.

The unauthorized unscrambling of pay television broadcasts, commonly known as piracy, is done:

either through the crypto-analysis of the data transmitted, to enable the recovery of the information elements by which the image can be unscrambled or, again, to enable the creation of authorization that has not really been transmitted, or by the physical analysis of the video signal which will enable the reconstruction of the original structure of the image through the use of its content and on the basis of knowledge of the particular features of the scrambling system.

2. Description of the Prior Art

In so-called first-generation systems, it has often been possible, by a simple processing of the video signal, to unscramble the image (scrambled by systems such as the video inversion or synchronization signal elimination systems). In the case of a so-called second generation system, such as those using the "line cut and rotate system" (namely the inversion of the image on at least one randomly determined point at which the line is cut, hereinafter called a "cut point"), it is known that the chief known method of piratical attack lies in the setting up of a horizontal correlation in order to determine the position of the cut point. The vertical correlation cannot, by itself, enable the structure of the image to be re-established and, at any rate, calls for very powerful and fast, hence very costly, computation and storage means.

As a consequence, to obtain a pirate decoder at a competitive price, it appears to be clear that the most frequent piratical attacks made are at the level of the detection of the cut point, either directly by logical analysis or by horizontal correlation or, finally, by both these methods.

SUMMARY OF THE INVENTION

An object of the invention is a scrambling method that can be used to make it very difficult to detect the cut point of at least a part of the lines of a video signal of a pay television system, this result being achieved in causing practically no inconvenience to duly authorized users.

Another object of the present invention is a device for the implementation of the method of the invention that is simple, inexpensive and easy to lay out in an existing system.

According to the invention, there is proposed a method for the protection of scrambling with line permutation or rotation about at least one cut point with, preferably, a smoothing interpolation, in the meeting zone of sections juxtaposed after rotation about the cut point (or points), wherein, in at least a part of the useful lines of at least a part of the frames of the video signal, for at least one zone of each of these lines, there is substituted a decoy imitating the structure of the corresponding meeting zone of the line segments after permutation. Advantageously, the insertion of the decoys is done only when the difference in amplitudes, in said structure, between the sample of the greatest amplitude and that of the smallest amplitude is smaller than a determined threshold. According to another aspect of the invention, a decoy is substituted for at least one zone of a line only when the amplitudes of the start and of the end of this zone are substantially the same as those of the start and the end of the decoy.

The device according to the invention comprises, in the transmitter, a memorization circuit synchronized by the scrambling pseudo-random generator and memorizing the sequence of interpolated samples about each cut point, a threshold circuit determining the difference in amplitude between the samples of the start and those of the end of said sequence, and a circuit for the insertion of samples connected to the memorization circuit, to the threshold circuit and to a pseudo-random generator.

DESCRIPTION OF THE DRAWINGS

The present invention will be understood more clearly from the following detailed description of an embodiment, taken as a non-restrictive example and illustrated by the appended drawings, of which.

DETAILED DESCRIPTION OF THE INVENTION

Figure 1:
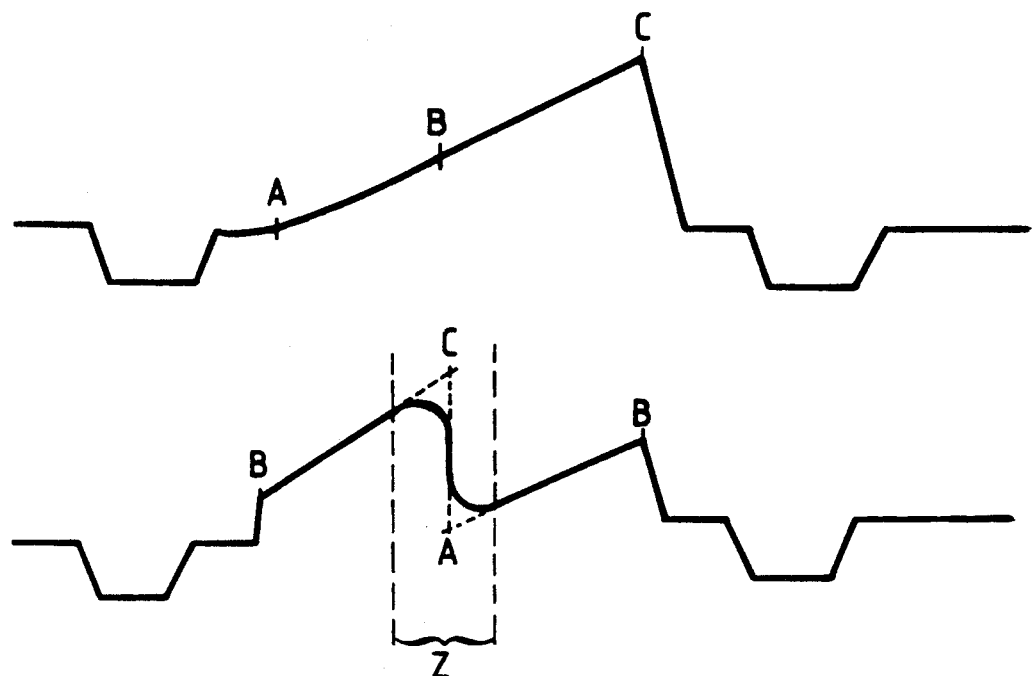
FIG. 1 is a timing diagram of a video signal line, before and after scrambling, into which the method of the invention introduces no decoy.

The method of the invention can be applied to a pay television system in which the scrambling is achieved by a "line cut and rotate" operation around a cut point determined by a pseudo-random generator. To prevent distortions produced by excessively sharp distortions in the meeting zone between the ends of segments that meet after rotation, the amplitude of the samples in the zone located about the meeting point of the line portions after inversion is smoothened, as shown in FIG. 1, and as described, for example, in the French patent application No. 88 17093 filed on 23rd Dec. 1988.

For this figure, the example chosen is that of the most unfavorable case, for which the part of the video line visible on the screen has the shape of a gradient rising from the point A to the point C. The transmitter has a generator of pseudo-random sequences that determines a cut point B. This point B may be located at any place on the line, between A and B.

The scrambling is achieved by mutual inversion of the positions of the line portions AB and BC. Thus, after scrambling, the displayed part of the video line has the portions BC and AB in that order. In FIG. 1, dashes are used to show the end of the segment BC and the start of the segment AB for, as can be seen easily in this figure, the difference in amplitudes between the points A and C is very high. In order to provide for a less sharp transition between these segments BC and AB, the amplitude of the samples at the end of the sengment BC and the start of the segment AB is smoothened by interpolation in the meeting zone Z of the portions BC and AB, as shown in a solid line in this FIG. 1. In such a case, according to the invention, no decoy (reproduction of the zone Z) is introduced into one of the segments BC or AB for, although such a decoy may be effective in avoiding the location of the true zone Z, there would be the risk of excessively disturbing the image obtained on the receiver of a duly authorized subscriber.

Figure 2:
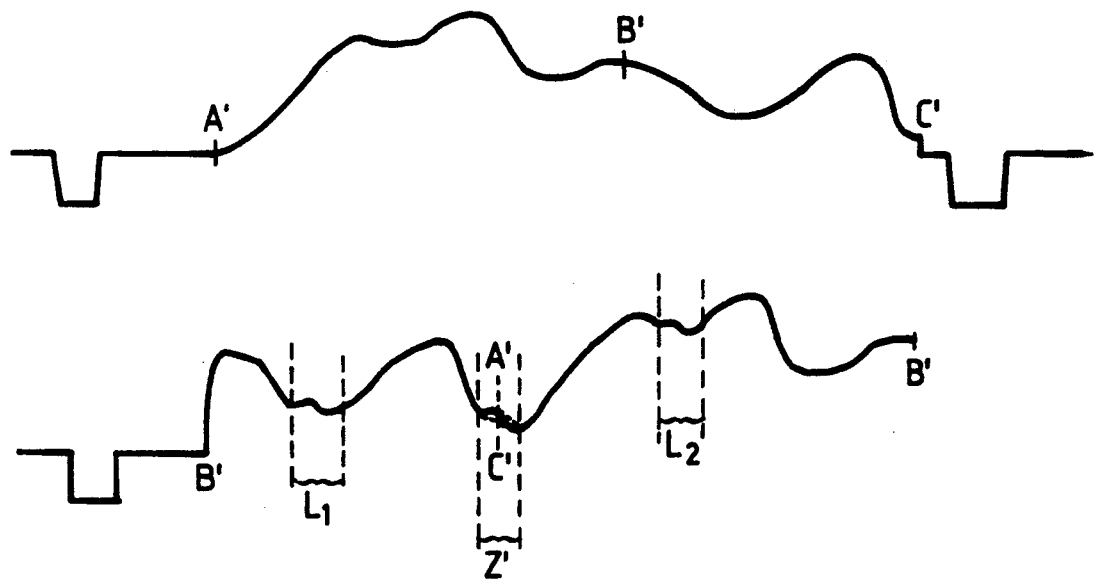
FIG. 2 is a timing diagram of a video signal line, before and after scrambling, into which the method of the invention introduces decoys.

FIG. 2 shows a video line in which the ends of the useful part are referenced A' and C'. A generator of pseudo-random sequences determines a cut point B' between A' and C'. It is observed that, after mutual inversion of the segments A'B' and B'C', the difference in amplitudes, in the zone Z', between the points A' and C', is relatively small (see the bottom graph in FIG. 2) and, consequently, this zone Z' could be used as a decoy. In this zone Z', the video signal after smoothing is shown in a solid line.

As can be seen from FIG. 2, two decoys L1 and L2, with a shape identical to that of the segment of the zone Z', have been introduced into the scrambled video line. Since the difference in amplitudes between the samples of maximum amplitude and the samples of minimum amplitude of these decoys is very small, these decoys create practically no problems for duly authorized users. This is all the more true as invention provides for the introduction of the decoys into only a part of the lines of the frames, and it is even possible to do so only for a part of the frames.

Figure 3:
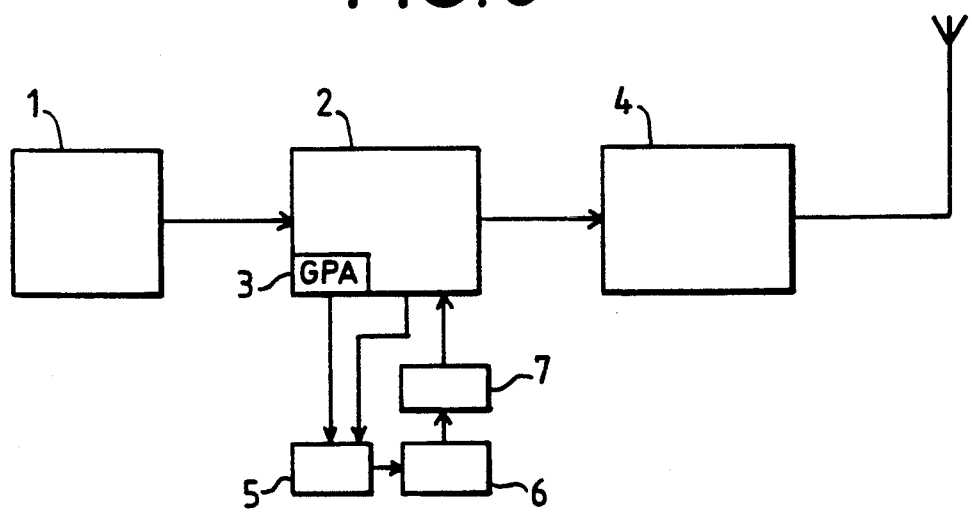
FIG. 3 is a block diagram of a device for the introduction of decoys according to the invention.

FIG. 3 shows a simplified block diagram of a pay television transmitter enabling the method of the invention to be implemented. A source 1 of digitalized video/audio signals is connected to a scrambling circuit 2 comprising a generator 3 of pseudo-random sequences. The circuit 2 is connected to amplification and transmission circuits 4.

The circuit 2 is further connected to a circuit 5 for the memorization of sequences of smoothened samples, which is itself connected to the generator 3, determining the cut points around which the smoothing is done. This circuit 5 is connected to a threshold circuit 6 and to a circuit 7 for the insertion of sequences into the video lines. This circuit 7 is connected to the circuit 2 and to the circuit 6.

According to a variant of the method of the invention, for each line, the respective amplitudes of the first sample and of the last sample of the zone Z are memorized, and a search is made, in the entire corresponding line, for a zone that has the same width as the zone Z and wherein the first sample and the last sample have substantially the same amplitudes as those of the zone Z. If such zones are found, the samples of the zone Z are inserted in the place of said zones. Naturally, as the case may be, the number of such replacements for one and the same line is limited to two or three so that the normally unscrambled image is not excessively disturbed. It is also clear that it is preferable to make a search, in each line, for zones having the amplitude characteristics of the corresponding zone Z, since it is not certain that this case arises at each line. However, if a large number of successive lines were to be in this situation, it would be possible to do the replacement for only a part of them.

To simplify this variant of the invention, the detection of zones having the same characteristics of amplitudes as the zone Z can be done on the line preceding the line in which the substitution if any will be done. Indeed, the zone Z achieves the junction between a point at the start of the segment AB and a point of the end of the segment BC. The probability of changing the level of these points from one line to the next one is low and, consequently, it is possible to make judicious and profitable use of this phenomenon to make a search, in a line L, for a zone similar to the zone Z of this line L, in actually using the zone Z of the line L-1.

What is claimed is:

1. A method for the protection, against unauthorized unscrambling, of television transmissions scrambled by line permutation about at least one cut point wherein, in at least a part of the useful lines of at least a part of the frames of the video signal, there is substituted, for at least one zone of each of these lines, a decoy imitating the structure of the corresponding meeting zone of the line segments after permutation.

2. A method according to claim 1, with interpolation of smoothing about the cut point after permutation, wherein the decoys imitate the interpolated structure at the level of the cut point of the same line.

3. A method for the protection, against unauthorized unscrambling, of television transmission scrambled by line permutation about at least one cut point wherein, in at least a part of the useful lines of at least a part of the frames of the video signal, a decoy which imitates the structure of a corresponding meeting zone of the line segments after permutation is substituted for at least one zone of each of said lines when a difference in amplitudes between the last samples of a line section and the first samples of the next line section is below a given threshold in the corresponding meeting zone of the two line sections, wherein said decoy is substituted after rotation about the cut point.

4. A method according to claim 3, wherein said threshold is determined in such a way that it creates no degradation of said video signal for duly authorized users.

5. A method according to claim 1, with interpolation of smoothing about the cut point after permutation, wherein the decoys imitate the interpolated structure at the level of the cut point of the preceding line.

6. A method for the protection, against unauthorized unscrambling, of television transmissions scrambled by line permutation about at least one cut point wherein, in at least a part of the useful lines of at least a part of the frames of the video signal, a decoy which imitates the structure of a corresponding meeting zone of the line segments after permutation, is substituted for at least one zone of a line only when at least the amplitudes of the start and of the end of said at least one zone are substantially the same as those of the start and the end of the decoy.

7. A device for the protection, against unauthorized unscrambling, of television transmissions scrambled by line permutation about a cut point, wherein said device comprises, in the transmitter, a memorization circuit synchronized by the scrambling pseudo-random generator and memorizing the sequence of interpolated samples about each cut point, a threshold circuit determining the difference in amplitudes between the samples of the start and those of the end of said sequence, and a circuit for the insertion of samples connected to the memorization circuit, to the threshold circuit and to a pseudo-random generator.

* * * * *